United States Patent
Hu et al.

(10) Patent No.: US 10,042,819 B2
(45) Date of Patent: Aug. 7, 2018

(54) CONVOLUTION ACCELERATORS

(71) Applicant: HEWLETT PACKARD ENTERPRISE DEVELOPMENT LP, Houston, TX (US)

(72) Inventors: Miao Hu, Palo Alto, CA (US); John Paul Strachan, San Carlos, CA (US); Naveen Muralimanohar, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 117 days.

(21) Appl. No.: 15/280,903

(22) Filed: Sep. 29, 2016

(65) Prior Publication Data

US 2018/0089146 A1    Mar. 29, 2018

(51) Int. Cl.
*G06F 15/00* (2006.01)
*G06F 17/14* (2006.01)
*G06F 17/15* (2006.01)

(52) U.S. Cl.
CPC .............. *G06F 17/14* (2013.01); *G06F 17/15* (2013.01)

(58) Field of Classification Search
CPC ................................. G06F 17/14; G06F 17/15
USPC ......................................... 708/400–405, 813
See application file for complete search history.

(56) References Cited

U.S. PATENT DOCUMENTS

| | | | | |
|---|---|---|---|---|
| 5,734,347 | A * | 3/1998 | McEligot | G01S 13/89 342/146 |
| 9,646,243 | B1 * | 5/2017 | Gokmen | G06N 3/0635 |
| 2005/0018782 | A1 * | 1/2005 | Costa | H04L 5/026 375/260 |
| 2005/0281188 | A1 * | 12/2005 | Cho | H04B 1/7136 370/208 |
| 2007/0253476 | A1 * | 11/2007 | Tirkkonen | H04L 1/06 375/230 |
| 2017/0091620 | A1 * | 3/2017 | Gokmen | G06F 17/16 |

* cited by examiner

*Primary Examiner* — Tan V. Mai
(74) *Attorney, Agent, or Firm* — Hewlett Packard Enterprise Patent Department (57) ABSTRACT

Examples herein relate to convolution accelerators. An example convolution accelerator may include a transformation crossbar array programmed to calculate a Fourier Transformation of a first vector with a transformation matrix and a Fourier Transformation of a second vector with the transformation matrix. A circuit of the example convolution accelerator may multiply the Fourier Transformation of the first vector with the Fourier Transformation of the second vector to calculate a product vector. The example convolution accelerator may have an inverse transformation crossbar array programmed to calculate an Inverse Fourier Transformation of the product vector according to an inverse transformation matrix.

18 Claims, 6 Drawing Sheets

CONVOLUTION ACCELERATORS

BACKGROUND

Fourier transformation is a mathematical operation with many applications, ranging from communication signal processing, differential equation analysis, image processing, audio processing, spectroscopy processing and so forth. For purposes of performing the Fourier transform in a digital processing system, the Fourier transform may be performed using a discrete transform, such as a Discrete Fourier Transform. The Discrete Fourier Transform is a matrix operation in which a real or complex value input vector (a vector representing sampled values for a temporally or spatially varying input signal, for example) is transformed into a complex value output vector (a vector representing frequency and phase components of the input signal, for example).

Convolution is a mathematical operation on two functions that produces a third function that is typically viewed as a modified version of one of the original functions. Convolution has applications that include image processing, probability, statistics, computer signal processing, electrical engineering, and differential equations. For large scale input signals and kernels, fast convolution operations may be computed in the frequency domain using a Discrete Fourier Transformation.

A resistive memory array can be utilized to perform analog computations that exploit the fundamental relationship between row voltage and column current in a resistive mesh to realize an analog multiply-accumulate unit. Such a unit may be faster than a digital computation, and may also consume significantly lower energy than traditional digital functional units. The memory array is typically organized as a grid of cells interconnected by horizontal and vertical wires, referred to as word/row lines and bit/column lines. The fundamental relationship between a row access voltage and a resulting bit line current can act as an analog multiplier of row voltage and memory array cell conductance. Large crossbar arrays of memory devices with memristors can be used in a variety of applications, including memory, programmable logic, signal processing control systems, pattern recognition, and other applications.

BRIEF DESCRIPTION OF THE DRAWINGS

The following detailed description references the drawings, wherein.

DETAILED DESCRIPTION

Memory cells are devices that may be used as components in a wide range of electronic circuits, such as memories, switches, radio frequency circuits, and logic circuits and systems. In a memory structure, a crossbar array of memory devices, which may include memristors, may be used. When used as a basis for memory devices, the resistance (or conductance) level of memory cell may be used to store a value. The resistance of a memory cell may be changed by applying an electrical stimulus, such as a voltage or a current, through the memory cell. Generally, at least one channel may be formed that is capable of being switched between at least two states—one in which the channel forms an electrically conductive path ("on") and one in which the channel forms a less conductive path ("off"). In some other cases, conductive paths represent "off" and less conductive paths represent "on". Furthermore, memory cells may also behave as an analog component with variable conductance. For example, a range of conductance levels of the memristor may be used to represent a range of analog values.

In some applications, a memory crossbar array can be used to perform vector-matrix computations, which can be scaled to matrix-matrix computations. The use of memory cells at junctions or cross-point of the crossbar array enables programming the resistance (or conductance) at each such junction. For example, the highest and lowest resistance values of the memory cells in the memory array may correspond to a maximum and a minimum resistance of any memory cell in the array. Every other memory cell may be mapped to a resistance according to its ratio with the highest and lowest resistance values. Each element of an input vector may be converted into an analog input voltage and applied to each corresponding row line of the crossbar array. The input voltage from each row line of the crossbar is weighted by the conductance of the resistive memory cells in each column line and accumulated as the current output from each column line. Ideally, if wire resistances can be ignored, the current, I, flowing out of the crossbar array will be approximately $I^T = V_T G$, where V is the input voltage and G is the conductance matrix, including contributions from each memory cell in the crossbar array.

Convolution is a mathematical operation on two functions that produces a third function that is typically viewed as a modified version of one of the original functions. Convolution is used in some image processing techniques, including the convolution of an image and a kernel matrix. The image and the kernel may be mapped to matrices, on which matrix multiplication may be calculated. However, convolution may be one of the most computation-intensive parts of the image processing technique.

For large scale input signals and kernels, it may be more efficient to compute convolutions in the frequency domain. However, memory limitations present challenges to implementing fast convolution computations in digital circuitry. Examples disclosed herein provide for hardware-based convolution accelerators that utilize memory crossbar arrays to calculate Fourier Transformations of a kernel and an image, a circuit to perform the convolution multiplication, and another memory crossbar array to calculate an Inverse Fourier Transformation. In this manner, convolution accelerators herein increase efficiency of fast convolution computations by using hardware to accelerate the Fourier Transformation and Inverse Fourier Transformation computations of the fast convolution procedure.

Figure 1:
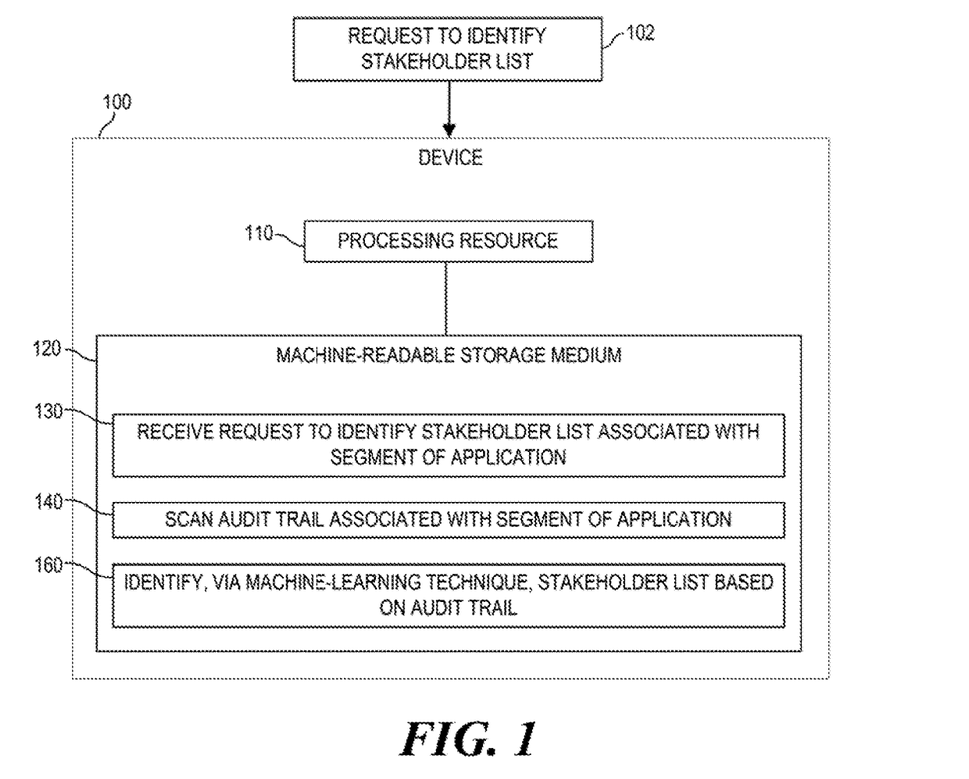
FIG. 1 is a schematic diagram of an example convolution accelerator.

Referring now to the drawings, FIG. 1 illustrates an example convolution accelerator 100. Convolution accelerator 100 may be a hardware system that calculates a convolution operation. Convolution accelerator 100 may calculate a convolution of an input matrix in relation to a transformation matrix. For example, in signal processing applications, the input matrix may be an image and the transformation matrix may represent a processing kernel.

Convolution accelerator 100 may calculate the convolution by matrix-multiplying the image with the kernel.

To calculate a matrix-multiplication of the two matrices, in some examples the input matrix and the transformation matrix may be broken down into sets of vectors, or be broken down and then concatenated into one or multiple longer vectors. For example, a first vector representing a portion of an image matrix may be multiplied by a second vector representing a portion of a kernel matrix. The resulting product vector may represent the convolution of the portion of the image matrix with the portion of the kernel matrix. The resulting product vector may then be concatenated or otherwise combined with other product vectors to generate a complete convolution of the image matrix and the kernel matrix. Such an operation is further illustrated below in relation to FIG. 3.

As explained herein, the multiplication operation of the convolution computation may be performed in the frequency domain. To do so, convolution accelerator 100 may compute a Fourier Transformation, such as a Discrete Fourier Transformation (DFT), of both the image matrix and the kernel matrix. The DFT of both matrices may be multiplied, and then an Inverse Fourier Transformation may be performed on the product to generate the convolution of the image matrix and the kernel matrix.

As an example, a transformation crossbar array 110 of convolution accelerator 100 may be programmed to calculate a Fourier Transformation (i.e., DFT) of a first vector 105A with a transformation matrix and a Fourier Transformation of a second vector 105B with the transformation matrix. In some examples, convolution accelerator 100 may have a buffer to store each result of the Fourier Transformation. As explained herein with reference to FIG. 2, the crossbar array 110 may be mapped to the transformation matrix. The first vector 105A may be part of an image signal, and the second vector 105B may be part of a kernel signal. The Fourier Transformation of the first vector 105A and second vector 105B may produce resulting vectors in the frequency domain. The first vector 105A and the second vector 105B may include either analog or digital values. In the latter instances, convolution accelerator 100 may have digital to analog converter that converts digital values of the vectors to analog values, for example voltage values. Further details are described below with reference to FIG. 2.

Continuing to refer to this example, a circuit 120 of convolution accelerator 100 may multiply the Fourier Transformation of the first vector 105A, represented by 115A, with the Fourier Transformation of the second vector 105B, represented by 115B, to calculate a product vector 125. As explained herein with relation to FIG. 4, circuit 120 may perform a digital multiplication of digital values of the Fourier Transformation 115A and the Fourier Transformation 115B. In such examples, circuit 120 may include an analog-to-digital converter to digitize the Fourier Transformations, a digital multiplier, and a digital-to-analog converter to convert the digital product vector back to an analog vector.

In response to multiplying the two Fourier Transformations, product vector 125 may be processed by an inverse transformation crossbar array 130 programmed to calculate an Inverse Fourier Transformation (i.e., I-DFT) of the product vector 125 according to an inverse transformation matrix. The Inverse Fourier Transformation may be represented by 135 and may be the convolution of the first vector 105A and the second vector 105B.

Furthermore, in some examples, transformation crossbar array 110 may calculate a Fourier Transformation of a third vector with the transformation matrix and of a fourth vector with the transformation matrix. The third vector may be a second part of the image signal, while the fourth vector may be a second part of the kernel signal. The circuit 120 may multiply the Fourier Transformation of the third vector with the Fourier Transformation of the fourth vector to calculate a second product vector, and the inverse transformation crossbar array 130 may calculate an Inverse Fourier Transformation of the second product vector according to the inverse transformation matrix.

In some instances, convolution accelerator 100 may have a circuit to concatenate the Inverse Fourier Transformation 135 of the product vector and the Inverse Fourier Transformation of the second product vector. In such a manner, convolution accelerator 100 facilitates the fast convolution technique, allowing for segregating of both the input matrix and the kernel into smaller portions for performing the convolution operation, and leverages hardware implementation of Fourier Transformations to perform the multiplication function of the convolution operation in the frequency domain.

Figure 2:
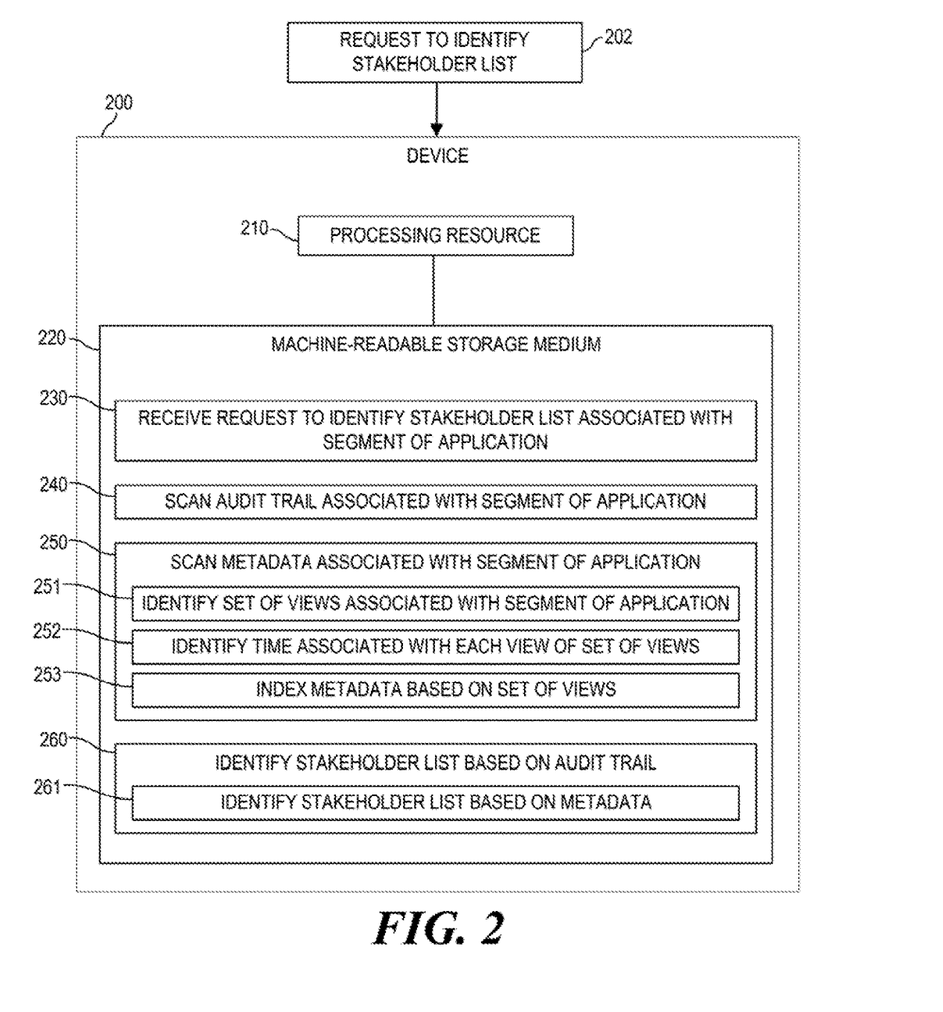
FIG. 2 is a circuit diagram of an example crossbar array.

FIG. 2 illustrates an example circuit diagram of an example crossbar array 200 used in example convolution accelerators disclosed herein, such as the transformation crossbar array 110 or the inverse transformation crossbar array 130 described in relation to FIG. 1 above. Crossbar array 200 may be a configuration of crossing (i.e., parallel and perpendicular) lines with memory cells coupled between lines at intersections. Crossbar array 200 may include a plurality of word lines 204, a plurality of bit lines 206, and a plurality of memory cells 208. A memory cell 208 may be coupled between each unique combination of one word line 204 and one bit line 206. In other words, no memory cell 208 shares both a word line and a bit line.

Word lines 204 may be electrodes that carry current through crossbar array 200. In some examples, word lines 204 may be parallel to each other, generally with equal spacing. Word lines 204 may sometimes be, for example, a top or row electrode. Similarly, bit lines 206 may be electrodes that run nonparallel to word lines 204. Bit lines 206 may sometimes be, for example, a bottom or column electrode. Word lines 204 and bit lines 206 may serve as electrodes that deliver voltage and current to the memory cells 208. Example materials for word lines 204 and bit lines 206 may include conducting materials such as Pt, Ta, Hf, Zr, Al, Co, Ni, Fe, Nb, Mo, W, Cu, Ti, TiN, TaN, $Ta_2N$, $WN_2$, NbN, MoN, $TiSi_2$, TiSi, $Ti_5Si_3$, $TaSi_2$, $WSi_2$, $NbSi_2$, $V_3Si$, electrically doped polycrystalline Si, electrically doped polycrystalline Ge, and combinations thereof. In the example of FIG. 2, crossbar array 200 may have N word lines and M bit lines.

Memory cells 208 may be coupled between world lines 204 and bit lines 206 at intersections of the word lines 204 and bit lines 206. For example, memory cells 208 may be positioned to calculate a Fourier Transformation or Inverse Fourier Transformation of a vector with respect to a transformation matrix or inverse transformation matrix. Each memory cell 208 may have a memory device such as a resistive memory element, a capacitive memory element, or some other form of memory.

In some examples, each memory cell 208 may include a resistive memory element. A resistive memory element may have a resistance that changes with an applied voltage or current. Furthermore, in some examples, the resistive memory element may "memorize" its last resistance. In this manner, each resistive memory element may be set to at least two states. In many examples, a resistive memory element may be set to multiple resistance states, which may facilitate various analog operations. The resistive memory element may accomplish these properties by having a memristor, which may be a two-terminal electrical component that provides memristive properties as described herein.

In some examples, a memristor may be nitride-based, meaning that at least a portion of the memristor is formed from a nitride-containing composition. A memristor may also be oxide-based, meaning that at least a portion of the memristor is formed from an oxide-containing material. Furthermore, a memristor may be oxy-nitride based, meaning that at least a portion of the memristor is formed from an oxide-containing material and that at least a portion of the memristor is formed from a nitride-containing material. Example materials of memristors may include tantalum oxide, hafnium oxide, titanium oxide, yttrium oxide, niobium oxide, zirconium oxide, or other like oxides, or non-transition metal oxides, such as aluminum oxide, calcium oxide, magnesium oxide, dysprosium oxide, lanthanum oxide, silicon dioxide, or other like oxides. Further examples include nitrides, such as aluminum nitride, gallium nitride, tantalum nitride, silicon nitride, and oxynitrides such as silicon oxynitride. In addition, other functioning memristors may be employed in the practice of the teachings herein.

A memristor may exhibit nonlinear or linear current-voltage behavior. Nonlinear may describe a function that grows differently than a linear function. In some implementations, a memristor may be linear or nonlinear in voltage ranges of interest. A voltage range of interest may be, for example, a range of voltages used in the operation of convolution accelerators.

In some examples, memory cell 208 may include other components, such as access transistors or selectors. For example, each memory cell 208 may be coupled to an access selector between the intersections of a word line 204 and a bit line 206. Access selectors may facilitate the targeting of individual or groups of memory cells 208 for the purposes of reading or writing the memory cells.

Alternatively, a selector may be an electrical device that may be used in memristor devices to provide desirable electrical properties. For example, a selector may be a 2-terminal device or circuit element that admits a current that depends on the voltage applied across the terminals. A selector may be coupled to each memory cell 208 to facilitate the targeting of individual or groups of memory cells 208. For example, a selector may do so by acting like an on-off switch, and it may mitigate sneak current disturbance.

The memory cells 208 of crossbar array 200 may be programmed according to a matrix. For example, transformation matrix 110 of FIG. 1 may be programmed according to a Discrete Fourier Transformation matrix, and inverse transformation matrix 130 may be programmed according to an Inverse Discrete Fourier Transformation matrix. The value stored in the memory cells 208 may represent the values of the matrix. In implementations of resistive memory, the resistance levels of each memory cell 208 may represent a value of the matrix. In such a manner, the memory cells 208 may be programmed to an array of resistances corresponding to the matrix. Memory cells 208 may be programmed, for example, by having programming signals driven through them, which drives a change in the state of the memory cells 208. The programming signals may define a number of values to be applied to the memory cells.

Continuing to refer to FIG. 2, crossbar array 200 may receive an input vector at the plurality of word lines 204. The input vector may be converted to input electrical signals 210 by a converter or circuit. The input electrical signals 210 may be, for example, an electrical current driven to the memory cells 208. However, the input electrical signals 210 may be, for example, voltage, an energy, or other form of electrical stimulus. Upon passing through the crossbar array 200, the plurality of bit lines 206 may deliver output electrical signals 214, where the output electrical signals 114 may be mapped to an output vector that represents, for example, a Fourier Transformation of the input vector. In some examples, crossbar array 200 may also include read circuitry 216 for converting the output electrical signals 214, which may be analog values, to the output vector, which may have digital values. In a specific example, read circuitry 216 may include an operational amplifier 218 and a resistor 220, which can be arranged to represent a virtual ground.

Crossbar array 200 may also include other peripheral circuitry associated with crossbar array 200. For example, an address decoder may be used to select a word line 204 and activate a drive circuit corresponding to the selected word line 204. The drive circuit for a selected word line 204 can drive a corresponding word line 204 with different voltages corresponding to a Fourier Transformation or the process of setting resistance values within memory cells 208 of crossbar array 200. Similar drive and decode circuitry may be included for bit lines 206. Control circuitry may also be used to control application of voltages at the inputs and reading of voltages at the outputs of crossbar array 200. Digital to analog circuitry and analog to digital circuitry may be used for input electrical signals 210 and output electrical signals 214. In some examples, the peripheral circuitry above described can be fabricated using semiconductor processing techniques in the same integrated structure or semiconductor die as crossbar array.

As described herein, there are two main operations that occur during operation of the crossbar 200 of a convolution accelerator. The first operation is to program the memory cells 208 in the crossbar array 200 so as to map the mathematic values in an N×M matrix to the array. In some examples, one memory cell 208 is programmed at a time during the programming operation. The second operation is the Fourier or Inverse Fourier Transformation calculation by vector-matrix multiplication. In this operation, input voltages are applied and output voltages obtained, corresponding to the result of multiplying an N×M matrix by an N×1 vector. In some examples, the input voltages are below the programming voltages so the resistance values of the memory cells 208, such as resistive memory, are not changed during the linear transformation calculation In an example, crossbar array 200 may calculate a transformation by applying a set of voltages $V^I$ 210 simultaneously along word lines 204 of the N×M crossbar array 200 and collecting the currents through bit lines 206 and measuring output voltage $V^O$ 214. On each bit line 206, every input voltage 210 is weighted by the corresponding memristance $(1/G_{ij})$ and the weighted summation is reflected at the output voltage 214. Using Ohm's law, the relation between the input voltages 210 and output voltages 214 can be represented by a vector-matrix multiplication of the form: $\{V^O\}^T = -\{V^I\}^T[G]Rs$, where $G_{ij}$ is an N×M matrix determined by the conductance (inverse of resistance) of crossbar array 200, Rs is the resistance value of the sense amplifiers and T denotes the transpose of the column vectors $V^O$ and $V^I$. The negative sign follows from use of a negative feedback operational amplifier in the sense amplifiers. From the foregoing, it follows that the crossbar array 200 can be utilized for multiplying a first vector of values $\{b_i\}^T$ by a matrix of values $[a_{ij}]$ to obtain a second vector of values $\{c_j\}^T$, where i=1,N and j=1,M. The vector operation can be set forth in more detail as follows.

$$a_{11}b_1 + a_{21}b_2 + \ldots + a_{N1}b_N = c_1$$

$$a_{1M}b_1 + a_{2M}b_2 + \ldots + a_{NM}b_N = c_M.$$

The vector processing or multiplication using the principles described herein generally starts by mapping a matrix of values [$a_{ij}$] onto crossbar array 200 or, stated otherwise, programming—e.g., writing—conductance values $G_{ij}$ into the crossbar junctions of the crossbar array 200.

In accordance examples herein, memristors used in memory cells 208 may have linear current-voltage relation. Linear current-voltage relations permit higher accuracy in the matrix multiplication process. However, crossbar arrays 200 having linear memristors are prone to having large sneak path currents during programming of the array 200, particularly when the size of crossbar array 200 is larger than a certain size, for instance, 32×32. In such cases, the current running through a selected memristor may not be sufficient to program the memristor because most of the current runs through the sneak paths. Alternatively, the memristor may be programmed at an inaccurate value because of the sneak paths.

To alleviate the sneak path currents in such instances, and especially when larger arrays are desired, an access device, such as an access transistor or a non-linear selector, may be incorporated within or utilized together with a memristor to minimize the sneak path currents in the array. More specifically, memory cell should be broadly interpreted to include memristive devices including, for example, a resistive memory element, a memristor, a memristor and transistor, or a memristor and other components.

Convolution accelerators using crossbar array 200 may be implemented as a hardware engine in a computing device. Example computing devices that include an example linear transformation accelerator may be, for example, a personal computer, a cloud server, a local area network server, a web server, a mainframe, a mobile computing device, a notebook or desktop computer, a smart TV, a point-of-sale device, a wearable device, any other suitable electronic device, or a combination of devices, such as ones connected by a cloud or internet network, that perform the functions described herein.

Figure 3:
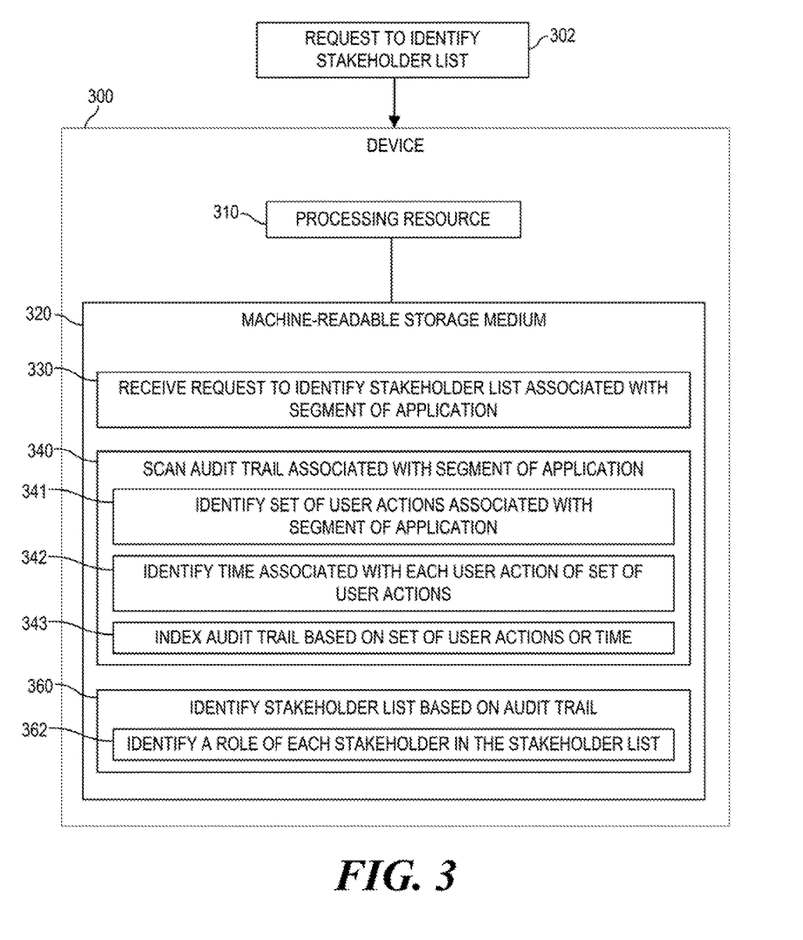
FIG. 3 is a schematic diagram of an example convolution operation.

FIG. 3 is a schematic diagram of an example convolution operation 300. Operation 300 may illustrate a convolution of an input signal with a kernel by breaking the input signal into vectors that can be multiplied with the kernel separately, and then the resulting vectors concatenated together to obtain a result. Operation 300 may, for example, be implemented on convolution engines disclosed herein.

As an example, an input signal 310 may represent the values of an image matrix. Due to operation complexity and/or hardware limitations, input signal 310 may be segregated into a plurality of vectors 315-1 to 315-N. Each vector 315 may be used to calculate a convolution with a kernel 320. The resulting vectors 325-1 to 325-N may represent the convolution of each part of the input signal with the kernel. The resulting vectors 325 may be concatenated to a resulting signal 330 that represents the convolution of the input signal 310.

In some examples, both an image and a kernel can be segregated into parts which can be processed separately and iteratively. For example, a first part of an image can be multiplied with a first part of a kernel to obtain a product. The product may be concatenated with the product of other parts of the image and the kernel to obtain the final result of the convolution operation. As described herein, Fourier Transformations can be applied to these parts of the image and kernel to allow more efficient operations. After completion of operations, such as the convolution multiplication, results can be subject to an Inverse Fourier Transformation to return the final value.

Figure 4:
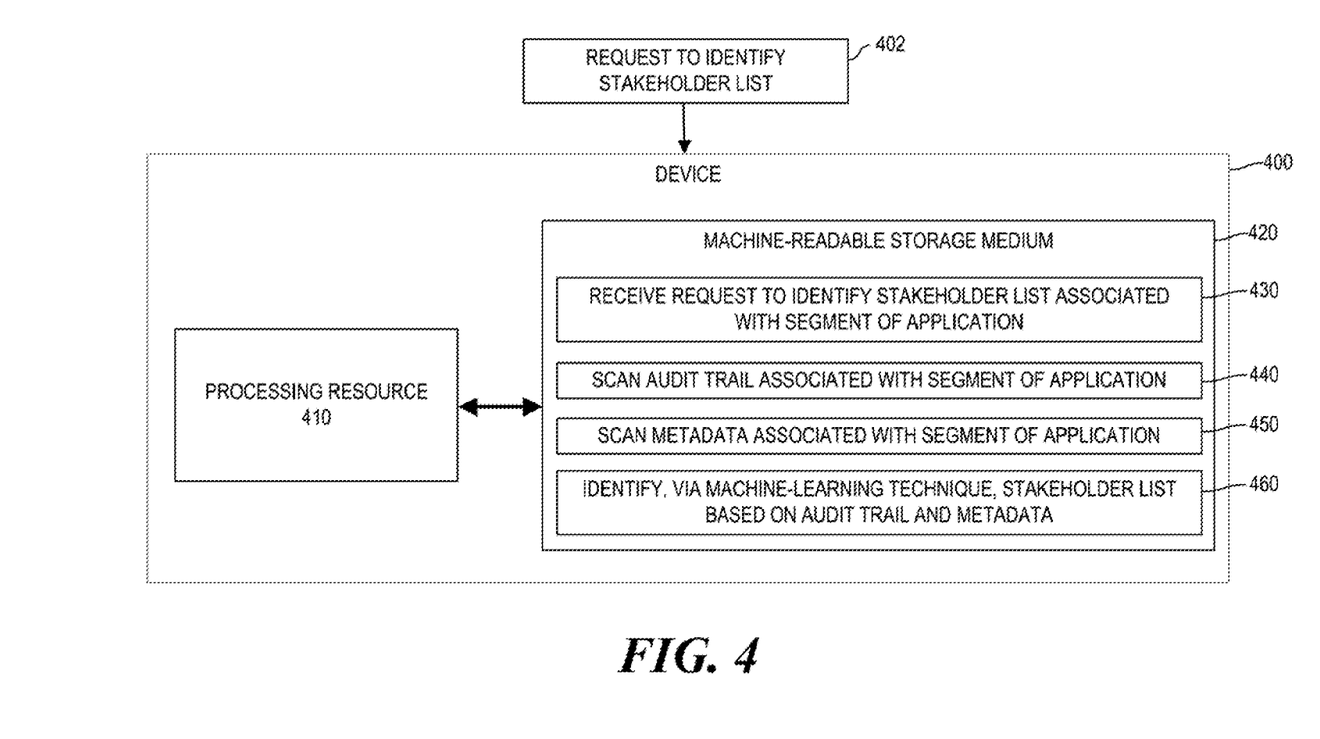
FIG. 4 is a schematic diagram of an example convolution accelerator having multiple transformation crossbar arrays.

FIG. 4 illustrates an example convolution accelerator 400 having multiple transformation crossbar arrays. Similar to convolution accelerator 100 of FIG. 1, convolution accelerator 400 may be a hardware unit that calculates a convolution operation, particularly using the fast convolution technique. Convolution accelerator 400 may calculate a convolution of an image matrix in relation to a kernel matrix by segregating one or both of the image matrix and the kernel matrix into vectors and then concatenating the result of each portion of the operation. Convolution accelerator 400 may convert a first vector (representing a piece of the image matrix) and a second vector (representing a piece of the kernel matrix) into the frequency domain by performing a Fourier Transformation, perform the convolution multiplication, and then convert the product vector back into the original domain (i.e., time domain) by applying an Inverse Fourier Transformation.

As illustrated in FIG. 4, convolution accelerator 400 may have two transformation crossbar arrays. A first transformation crossbar array 410A may be programmed to calculate a Fourier Transformation (i.e., DFT) of a first vector 405A with a transformation matrix. A second transformation crossbar array 410B may be programmed to calculate a Fourier Transformation (i.e., DFT) of a second vector 405B with the transformation matrix. In some examples, the two crossbar arrays may be mapped to the transformation matrix, and in some examples, the calculation of the Fourier Transformations may be conducted in parallel. As explained previously, the first vector 405A may be part of an image, and the second vector 405B may be part of a kernel.

A digital circuit 420 may multiply the Fourier Transformation 415A of the first vector with the Fourier Transformation 415B of the second vector to calculate a product vector 425. Digital circuit 420 may include an analog-to-digital converter (ADC) 422 for converting each of the Fourier Transformations 415A and 415B to digital values, which may then be multiplied by digital multiplier circuit 424. The digital product may then be converted back to analog values by a digital-to-analog converter (DAC) 426.

In response to multiplying the two Fourier Transformations by digital circuit 420, product vector 425 may be processed by an inverse transformation crossbar array 430 programmed to calculate an Inverse Fourier Transformation (i.e., I-DFT) of the product vector 425 according to an inverse transformation matrix. The Inverse Fourier Transformation may be represented by 435 and may be the convolution of the first vector 405A and the second vector 405B.

Convolution accelerator 400 may have a concatenate circuit 440 to concatenate the convolution results of the parts of the image and the parts of the kernel. As described herein, a third vector may be a second part of the image, and a fourth vector may be a second part of the kernel. Convolution accelerator 400 may calculate a second Inverse Fourier Transformation of a second product vector that represents a convolution of the second part of the image and the second part of the kernel. In such a manner, convolution accelerator 400 facilitates the fast convolution technique, allowing for segregating of both the input matrix and the kernel into smaller portions for performing the convolution operation, and leverages hardware implementation of Fourier Transformations to perform the multiplication function of the convolution operation in the frequency domain.

Figure 5:
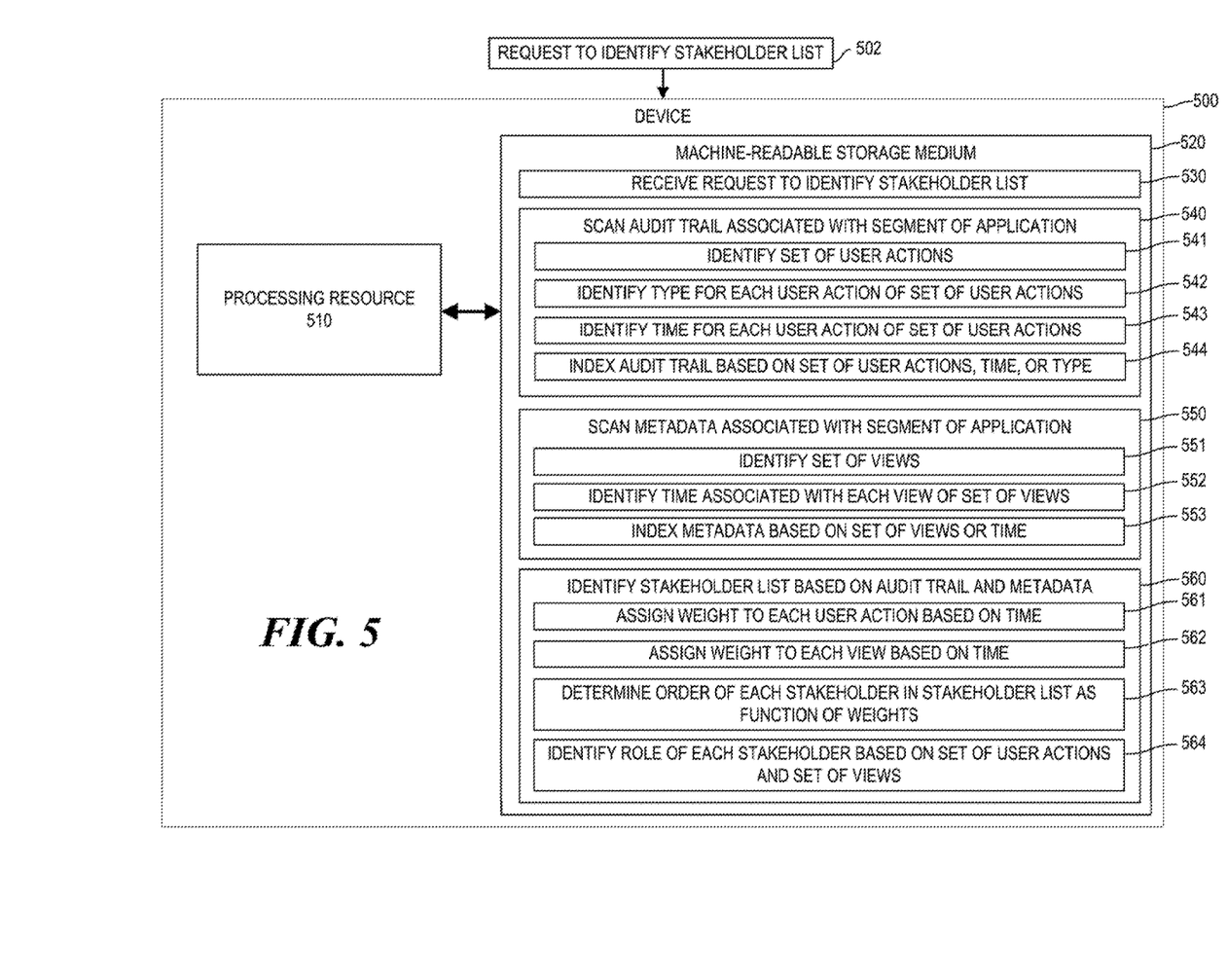
FIG. 5 is a flowchart of an example method for calculating a convolution.

FIG. 5 depicts a flowchart of an example method 500 for calculating a convolution. Although execution of method 500 is herein described in reference to convolution accelerator 100 of FIG. 1, other suitable examples of method 500 should be apparent, including the examples provided in FIG. 2-4.

In an operation 510, a crossbar array may receive a first set of analog voltages corresponding to a first vector. The crossbar array may be programmed according to a transformation matrix and may, in an operation 520, calculate a Fourier Transformation of the first vector with the transformation matrix. Similarly, in an operation 530, the crossbar array may receive a second set of analog voltages corresponding to a second vector. In an operation 540, the crossbar array may calculate a Fourier Transformation of the second vector with the transformation matrix. As noted above in some examples, operations 510-520 and 530-540 may be performed in parallel involving two crossbar arrays each programmed according to the transformation matrix. Alternatively, the operations may be performed iteratively on one crossbar array, with a buffer storing the results between operations.

In an operation 550, the Fourier Transformation of the first vector may be multiplied with the Fourier Transformation of the second vector to calculate a product vector. An inverse transformation crossbar programmed according to an inverse transformation matrix may, in an operation 560, calculate an Inverse Fourier Transformation of the product vector according to the inverse transformation matrix. Accordingly, the Inverse Fourier Transformation of the product vector may represent a convolution of the first vector with the second vector.

Figure 6:
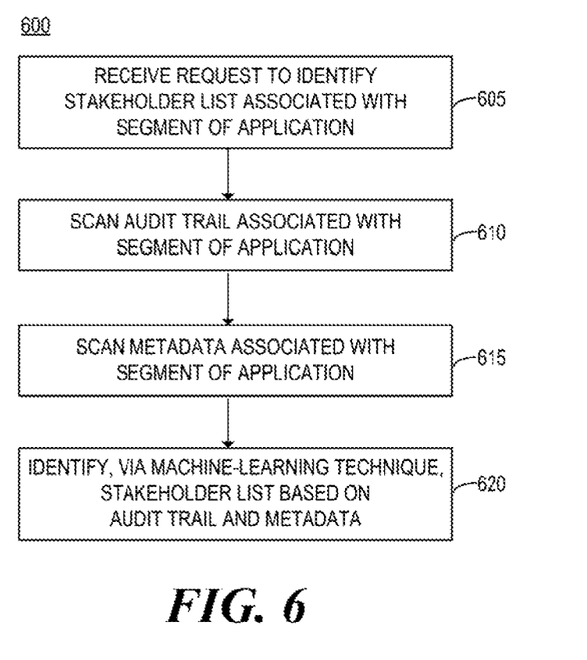
FIG. 6 is a flowchart of an example method for calculating a convolution including concatenating two intermediate results.

FIG. 6 depicts a flowchart of an example method 600 for calculating a convolution including concatenating two intermediate results. For example, after calculating an Inverse Fourier Transformation of a product vector, such as by execution of method 500, an Inverse Fourier Transformation of a second product vector may be calculated in method 600. The two results may be concatenated to calculate a convolution of a matrix that includes the first vector and a third vector and of a kernel that includes the second vector and a fourth kernel.

For example, in an operation 620, a Fourier Transformation of a third vector with the transformation matrix and a Fourier Transformation of a fourth vector with the transformation matrix may be calculated. In an operation 650, the Fourier Transformations of the third vector and of the fourth vector may be multiplied to calculate a second product vector. In an operation 660, an Inverse Fourier Transformation of the second product vector may be calculated according to the inverse transformation matrix. In an operation 670, the Inverse Transformation of the product vector and the Inverse Transformation of the second product vector may be concatenated.

The foregoing describes a number of examples for convolution accelerators and their applications. It should be understood that the examples described herein may include additional components and that some of the components described herein may be removed or modified without departing from the scope of the examples or their applications. It should also be understood that the components depicted in the figures are not drawn to scale, and thus, the components may have different relative sizes with respect to each other than as shown in the figures.

Further, the sequence of operations described in connection with FIGS. 1-6 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

It should further be noted that, as used in this application and the appended claims, the singular forms "a," "an," and "the" include plural elements unless the context clearly dictates otherwise.

The invention claimed is:

1. A convolution accelerator, comprising:
a transformation crossbar array programmed to calculate a Fourier Transformation of a first vector with a transformation matrix and a Fourier Transformation of a second vector with the transformation matrix;
a circuit to multiply the Fourier Transformation of the first vector with the Fourier Transformation of the second vector to calculate a product vector; and
an inverse transformation crossbar array programmed to calculate an Inverse Fourier Transformation of the product vector according to an inverse transformation matrix,
wherein the transformation crossbar array comprises a plurality of row lines, a plurality of column lines, and a memory cell coupled between each unique combination of one row line and one column line, wherein the memory cells are programmed according to the transformation matrix; and
the inverse transformation crossbar array comprises a plurality of row lines, a plurality of column lines, and a memory cell coupled between each unique combination of one row line and one column line, wherein the memory cells are programmed according to the inverse transformation matrix.

2. The convolution accelerator of claim 1, wherein the memory cells of the transformation crossbar array are programmed to an array of resistances corresponding to the transformation matrix, and the memory cells of the inverse transformation crossbar array are programmed to an array of resistances corresponding to the inverse transformation matrix.

3. The convolution accelerator of claim 2, wherein a set of analog voltages corresponding to the first vector is delivered to the transformation crossbar array to calculate the Fourier Transformation of the first vector, and a set of analog values corresponding to the second vector is delivered to the transformation crossbar array to calculate the Fourier Transformation of the second vector.

4. The convolution accelerator of claim 2, wherein each memory cell of the transformation crossbar array and each memory cell of the inverse transformation crossbar array comprises a memristor.

5. The convolution accelerator of claim 1, wherein:
the transformation crossbar array is to calculate a Fourier Transformation of a third vector with the transformation matrix and a Fourier Transformation of a fourth vector with the transformation matrix;

the circuit is to multiply the Fourier Transformation of the third vector with the Fourier Transformation of the fourth vector to calculate a second product vector; and the inverse transformation crossbar array is to calculate an Inverse Fourier Transformation of the second product vector according to the inverse transformation matrix.

6. The convolution accelerator of claim 1, wherein the first vector is a part of an image signal comprising the first vector, and the second vector is a part of a kernel signal comprising the second vector.

7. The convolution accelerator of claim 5, further comprising a circuit to concatenate the Inverse Fourier Transformation of the product vector and the Inverse Fourier Transformation of the second product vector.

8. The convolution accelerator of claim 1, wherein the circuit to calculate the product vector comprises:
an analog-to-digital converter to convert the Fourier Transformation of the first vector to a digitized Fourier Transformation of the first vector and convert the Fourier Transformation of the second vector to a digitized Fourier Transformation of the second vector;
a digital multiplier circuit to multiply the digitized Fourier Transformation of the first vector with the digitized Fourier Transformation of the second vector to calculate a digitized product vector; and
a digital-to-analog converter to convert the digital product vector to the product vector, wherein the product vector comprises analog values.

9. A circuit, comprising:
a first transformation crossbar array programmed to calculate a Fourier Transformation of a first vector with a transformation matrix,
a second transformation crossbar array programmed to calculate a Fourier Transformation of a second vector with the transformation matrix, wherein each of the first transformation crossbar and the second transformation crossbar array comprises a plurality of row lines, a plurality of column lines, and a memory cell coupled between each unique combination of one row line and one column line, wherein the memory cells are programmed according to an array of resistances corresponding to the transformation matrix;
a digital circuit to multiply the Fourier Transformation of the first vector with the Fourier Transformation of the second vector to calculate a product vector; and
an inverse transformation crossbar array programmed to calculate an Inverse Fourier Transformation of the product vector according to an inverse transformation matrix, wherein the inverse transformation crossbar array comprises a plurality of row lines, a plurality of column lines, and a memory cell coupled between each unique combination of one row line and one column line, wherein the memory cells are programmed to an array of resistances corresponding to the inverse transformation matrix.

10. The circuit of claim 9, wherein a set of analog voltages corresponding to the first vector is delivered to the first transformation crossbar array to calculate the Fourier Transformation of the first vector, and a set of analog values corresponding to the second vector is delivered to the second transformation crossbar array to calculate the Fourier Transformation of the second vector.

11. The circuit of claim 9, wherein the first vector is a part of an image signal comprising the first vector, and the second vector is a part of a kernel signal comprising the second vector.

12. The circuit of claim 9, wherein:
the first transformation crossbar array is to calculate a Fourier Transformation of a third vector with the transformation matrix;
the second transformation crossbar array is to calculate a Fourier Transformation of a fourth vector with the transformation matrix;
the digital circuit is to multiply the Fourier Transformation of the third vector with the Fourier Transformation of the fourth vector to calculate a second product vector; and
the inverse transformation crossbar array is to calculate an Inverse Fourier Transformation of the second product vector according to the inverse transformation matrix.

13. The circuit of claim 12, further comprising a circuit to concatenate the Inverse Fourier Transformation of the product vector and the Inverse Fourier Transformation of the second product vector.

14. The circuit of claim 9, wherein the digital circuit to calculate the product vector comprises:
an analog-to-digital converter to convert the Fourier Transformation of the first vector to a digitized Fourier Transformation of the first vector and convert the Fourier Transformation of the second vector to a digitized Fourier Transformation of the second vector;
a digital multiplier circuit to multiply the digitized Fourier Transformation of the first vector with the digitized Fourier Transformation of the second vector to calculate a digitized product vector; and
a digital-to-analog converter to convert the digital product vector to the product vector, wherein the product vector comprises analog values.

15. A method, comprising:
receiving, by a transformation crossbar array programmed to calculate Fourier Transformations, a first set of analog voltages corresponding to a first vector;
calculating, by the transformation crossbar array, a Fourier Transformation of the first vector with a transformation matrix;
receiving, by the transformation crossbar array, a second set of analog voltages corresponding to a second vector;
calculating, by the transformation crossbar array, a Fourier Transformation of the second vector with the transformation matrix;
multiplying, by a circuit, the Fourier Transformation of the first vector with the Fourier Transformation of the second vector to calculate a product vector;
calculating, by an inverse transformation crossbar array programmed to calculate Inverse Fourier Transformations, an Inverse Fourier Transformation of the product vector according to an inverse transformation matrix;
calculating, by the transformation crossbar array, a Fourier Transformation of a third vector with the transformation matrix and a Fourier Transformation of a fourth vector with the transformation matrix;
multiplying, by the circuit, the Fourier Transformation of the third vector with the Fourier Transformation of the fourth vector to calculate a second product vector;
calculating, by the inverse transformation crossbar array, an Inverse Fourier Transformation of the second product vector according to the inverse transformation matrix; and
concatenating, by a second circuit, the Inverse Fourier Transformation of the product vector and the Inverse Fourier Transformation of the second product vector.

16. The method of claim 15, wherein the first vector and the third vector are parts of an image signal comprising the first vector and the third vector, and the second vector and the fourth vector are parts of a kernel signal comprising the second vector and the fourth vector.

17. The method of claim 15, wherein:
the transformation crossbar array comprises a plurality of row lines, a plurality of column lines, and a memory cell coupled between each unique combination of one row line and one column line, wherein the memory cells are programmed according to an array of resistances corresponding to the transformation matrix; and
the inverse transformation crossbar array comprises a plurality of row lines, a plurality of column lines, and a memory cell coupled between each unique combination of one row line and one column line, wherein the memory cells are programmed to an array of resistances corresponding to the inverse transformation matrix.

18. The method of claim 15, wherein the circuit to calculate the product vector comprises:
an analog-to-digital converter to convert the Fourier Transformation of the first vector to a digitized Fourier Transformation of the first vector and convert the Fourier Transformation of a second vector to a digitized Fourier Transformation of the second vector;
a digital multiplier circuit to multiply the digitized Fourier Transformation of the first vector with the digitized Fourier Transformation of the second vector to calculate a digitized product vector; and
a digital-to-analog converter to convert the digital product vector to the product vector, wherein the product vector comprises analog values.

* * * * *